March 20, 1928. 1,662,937
C. RAMSDELL
WATER POWER
Filed July 23, 1926 4 Sheets-Sheet 1
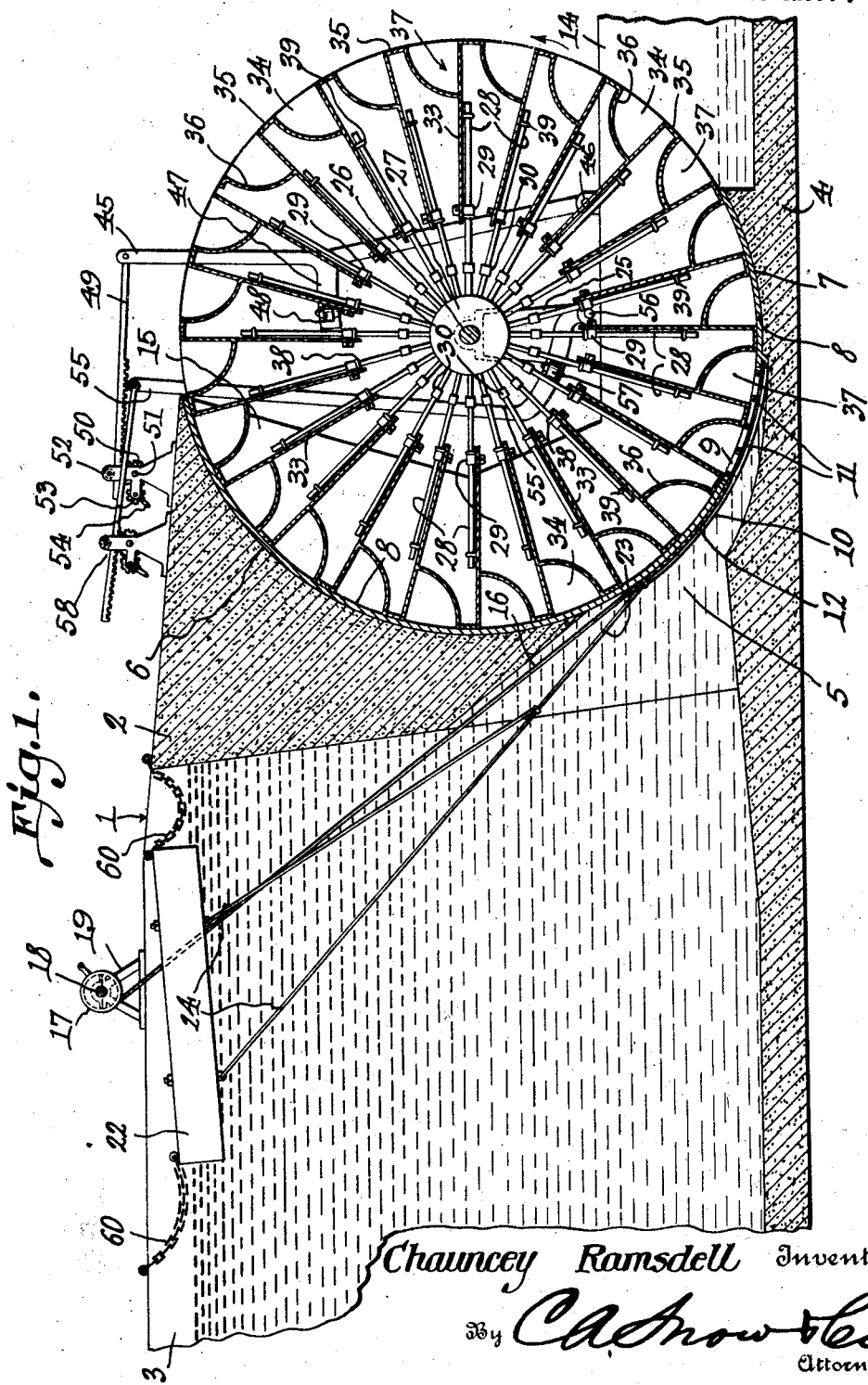
Chauncey Ramsdell Inventor
By C.A.Snow & Co.
Attorneys

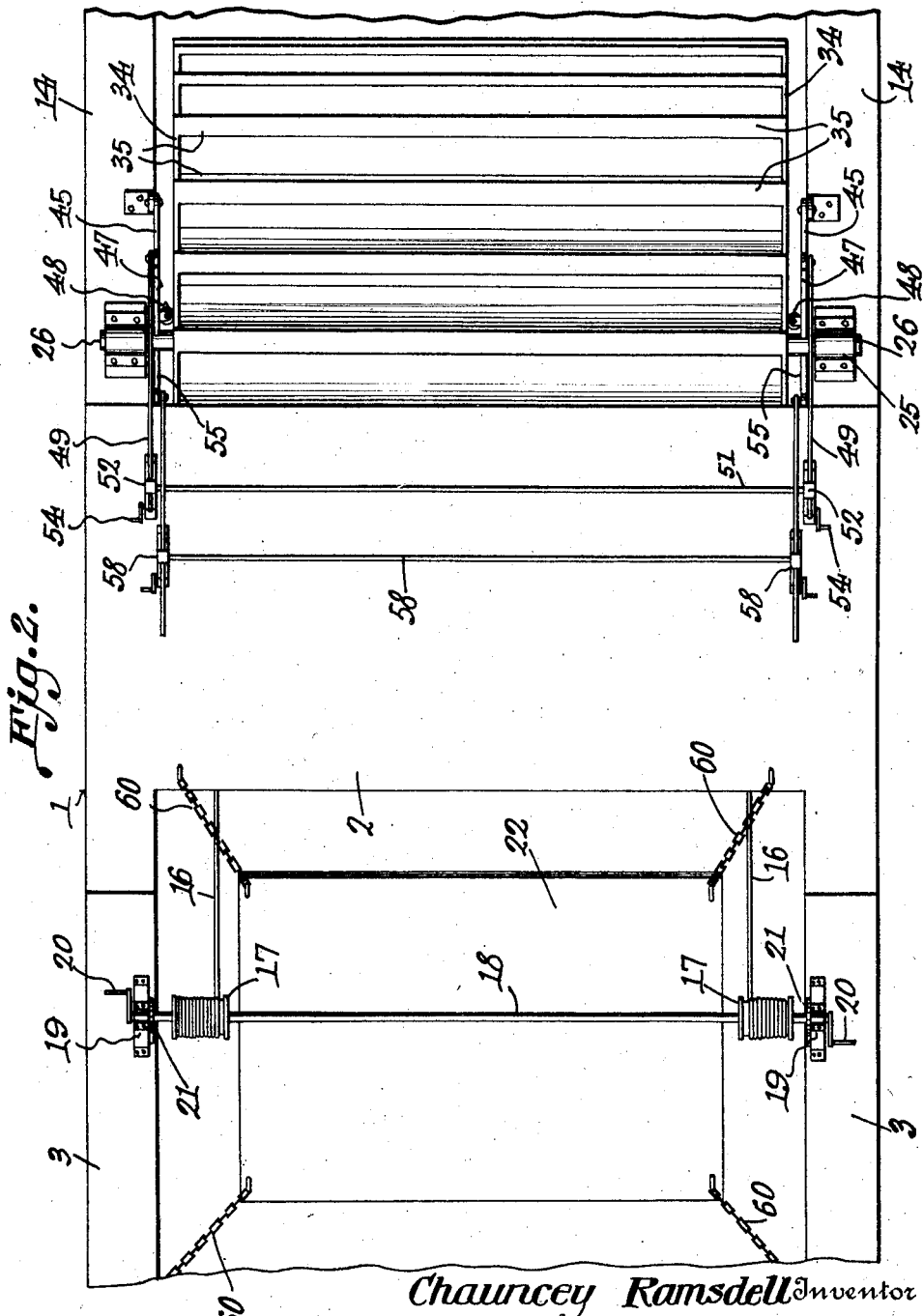

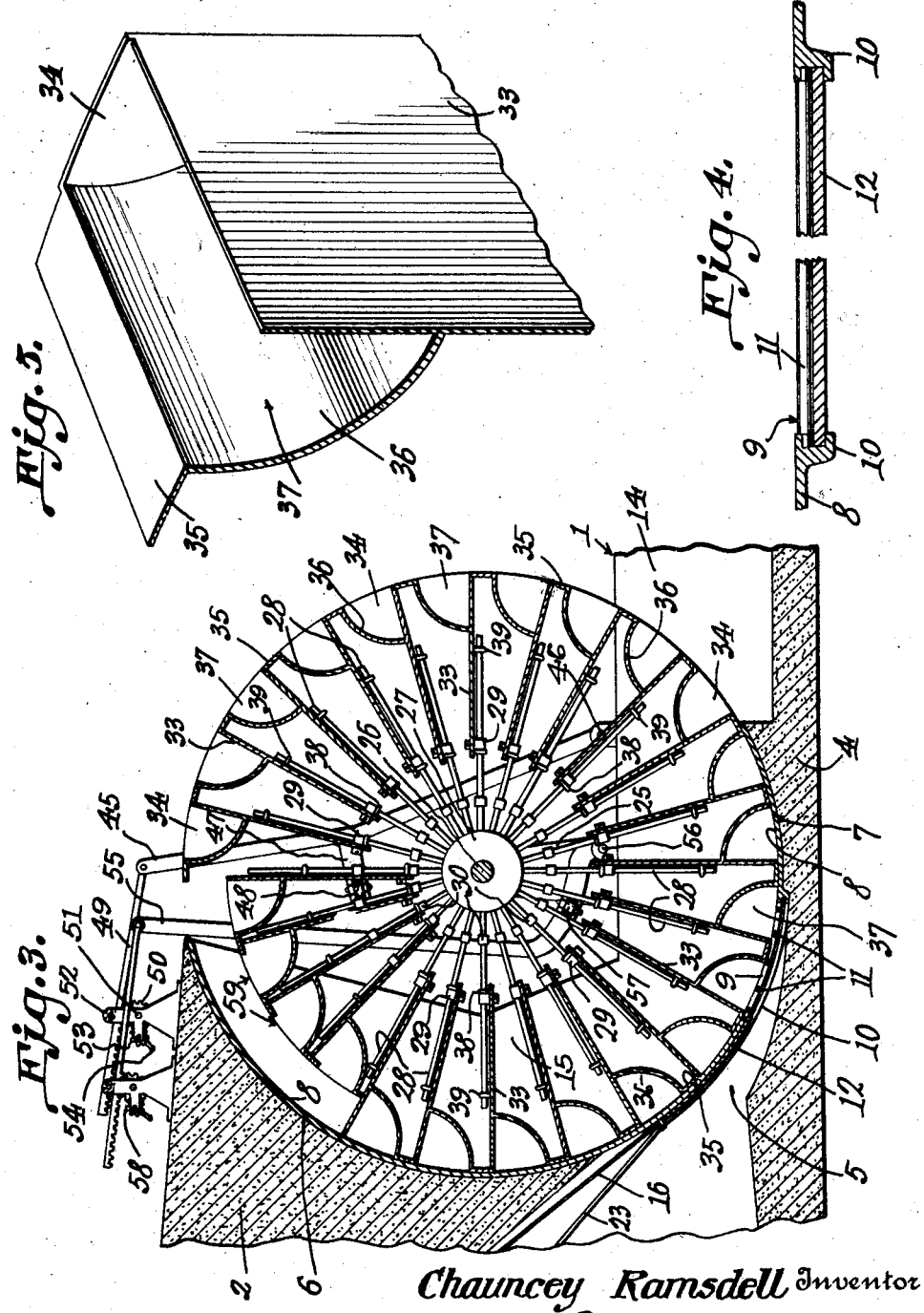

March 20, 1928. 1,662,937
C. RAMSDELL
WATER POWER
Filed July 23, 1926 4 Sheets-Sheet 4
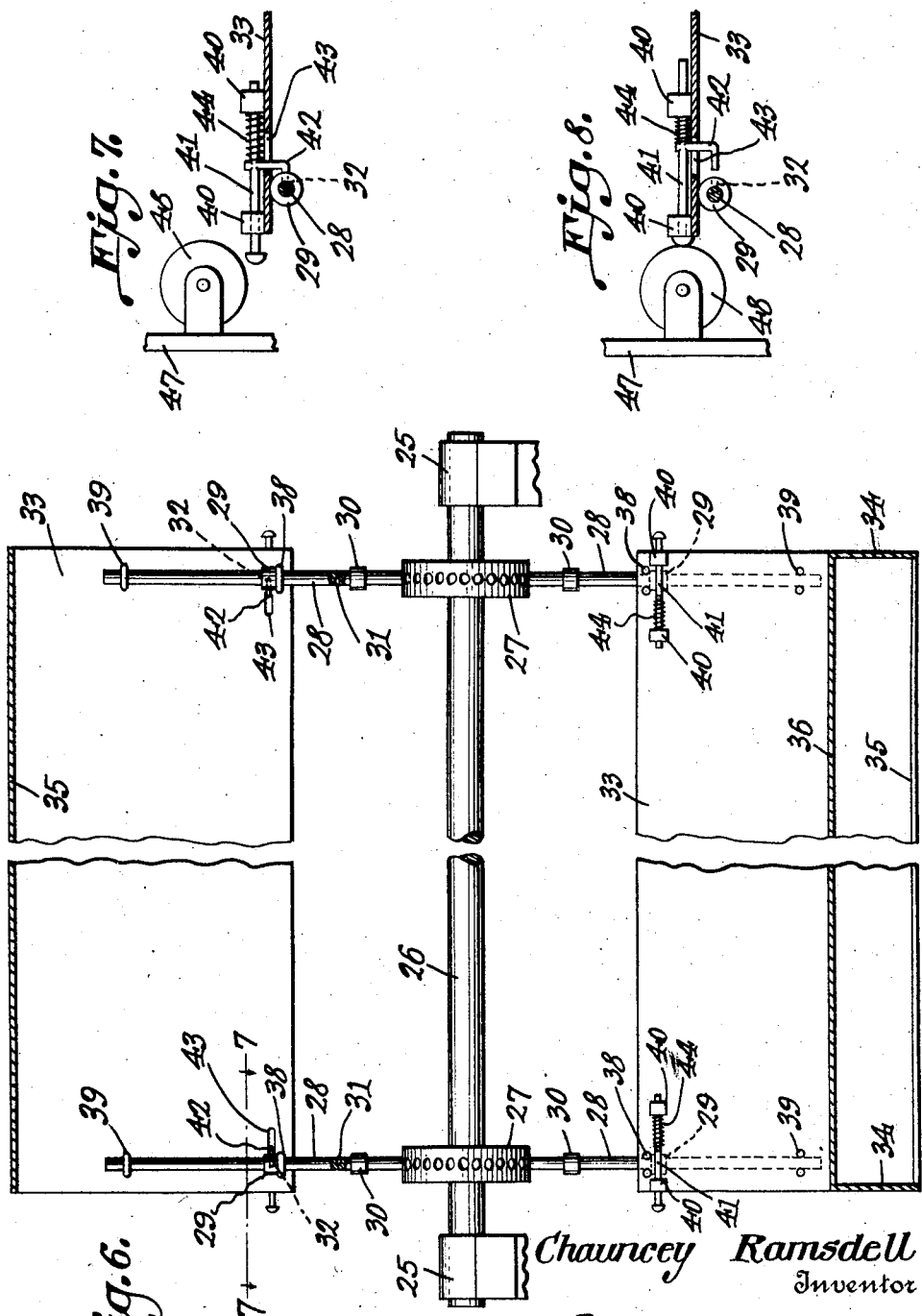
Chauncey Ramsdell
Inventor Patented Mar. 20, 1928.

1,662,937

UNITED STATES PATENT OFFICE.

CHAUNCEY RAMSDELL, OF FORESTVILLE, NEW YORK.

WATER POWER.

Application filed July 23, 1926. Serial No. 124,453.

This invention aims to provide a novel water power, as many of the units or water wheels, as is desired, being used, one down stream from the other.

The invention aims to provide novel means whereby each water wheel is rendered inoperative at the will of the person in control.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the drawings:—

Figure 1 shows in vertical longitudinal sections, a device constructed in accordance with the invention;

Figure 2 is a top plan;

Figure 3 is a view similar to Figure 1 but showing some of the blades of the water wheel retracted;

Figure 4 is a sectional view showing the anti-friction mounting for the gage;

Figure 5 is a perspective view showing a portion of one of the blades;

Figure 6 is an elevation of the water wheel, parts being broken away and parts appearing in section;

Figure 7 is a section on the line 7—7 of Figure 6 with added details;

Figure 8 is a view similar to Figure 7 but showing the parts as they will appear when the latch has been detached from the spoke of the water wheel.

Figure 9 is a sectional view showing the parts as they will appear when the blades are about to be released at the bottom of the wheel, for downward movement.

In carrying out the invention, there is provided a supporting structure 1, including a dam 2 and wing walls 3, the supporting structure including an apron 4 the walls of which are denoted by the numeral 14, the walls being carried upwardly along the face of the dam 2, as shown at 15. The dam 2 has a concaved face 6, and a portion of the apron 4 is also concaved, as shown at 7. Along the concaved faces 6 and 7 of the dam 2 and of the apron 4, respectively, extends a strong metal plate 8, forming part of the dam 2, the plate 8 having an opening 9 communicating with an opening 5 which extends through the dam 2. The plate 8 has guides 10 and carries rollers 11. A heavy gate 12 slides in the guides 10 in engagement with the rollers 11, the gate controlling the opening 9 through which the water flows to the water wheel hereinafter described.

The gate 12 tends to move to closed position by gravity and due to the water rushing through the opening 9. In order that the gate 12 may be raised by an operator, flexible elements 16 are attached to the gate, and are extended upwardly, the flexible elements 16 being wound about drums 17 on a shaft 18 supported for rotation on bearings 19 carried by the wing walls 3. The shaft 18 may be rotated by means of cranks 20, or in any other suitable way, and pawl and ratchet mechanisms 21 prevent retrograde rotation of the shaft 18 and the drums 17. Obviously, by rotating the shaft 18, the operator can reel in or pay out the flexible elements 16, and in this way, the gate 12 may be raised or lowered so as to control the effective size of the opening 9, or to close the opening. A float 22 is supported on the water behind the dam 2, and the float is connected to the gate 12 by a flexible element 23 having branches 24 which are connected to the float 22. By the time that the water has attained the level indicated in Figure 1, the float 22 and the lines 24 and 23 will have pulled the gate 12 to an open position, if the operator has not already opened the gate by means of the flexible element 16 and attendant parts. The result is that the water will never rise high enough to run over the crest of the dam, and other undesirable consequences will be avoided.

Bearings 25 are erected on the walls 14, and in the bearings 25, the shaft 26 of a water wheel is journaled. The shaft 26 carries hubs 27, from which project spokes 28 carrying outer stop collars 29 and inner stop collars 30. In the spokes 28, between the collars 29 and 30, seats 31 are formed. There are seats 32 in the collars 29 and in the spokes 28 of the water wheel.

The water wheel comprises a plurality of blades, one of which is partially shown in Figure 5. Each blade of the water wheel includes a body 33, in the form of a plate, end walls 34, a circumferentially extended lip 35, and a concave portion 36 connecting the inner end of the lip 35 with the body 33 at a point spaced from the outer end of the body, the concave portion 36 being connected with the end walls 34. The construction is such that pockets 37 are formed in the periphery of the water wheel, and in these pockets, the water is received, to propel the wheel. The body 33 of each blade has inner eyes 38 and outer eyes 39 slidably mounted on the spokes 28, the inner eyes 38 being disposed between the collars 29 and 30, and the outer eyes 39 being disposed outwardly of the collars 29, the construction being such that each blade of the water wheel can have a radial movement on the spokes 28. Guides 40, shown in Figure 7, are mounted on the body 33 of the water wheel blade near to each side thereof. In the guides 40, a slide 41 is mounted for right-line reciprocation, each slide being supplied with an angular latch 42 extended through an opening 43 in the body 33 of the water wheel blade, the latch 42 being adapted to engage in the seat 31 or in the seat 32, under the impulse of a compression spring 44 surrounding the slide 41, one end of the spring 44 abutting against one of the guides 40, and the other end of the compression spring abutting against the latch 42, as shown in Figures 7 and 8 of the drawings.

Releasing levers 45 are fulcrumed at 46 on the walls 14 and are supplied intermediate their ends with short outstanding arms 47 whereon rollers 48 are journaled. Rack bars 49 are pivoted to the upper ends of the levers 45, and the rack bars mesh with pinions 50 carried by a shaft 51 journaled in bearings 52 on the dam 2, the pinions 50 being driven by small gear wheels 53 journaled on the bearings 52 and operated by cranks 54. The arms 47 and the roller 48 at each side of the structure, are located above the center of rotation of the water wheel. Levers 55 are fulcrumed at 56 on the walls 14 and carry rollers 57, located below the center of rotation of the water wheel. The levers 55 are operated by a mechanism which is like that employed for operating the levers 45, and, therefore, the operating mechanism for the levers 45 is designated generally in the drawings by the numeral 58.

Suppose that the latches 42 are engaged in the seats 32, as shown in Figure 7. Then all of the blades of the water wheel are held out to the periphery of the water wheel. The levers 45 and 55 are in such positions that the rollers 48 and 57 cannot engage the outer ends of the slides 41. Then, the water flowing through the opening 9 in the face plate 8, will be received in the pockets 37, and the wheel, operating as an undershot wheel, will deliver the power. When it is desired to stop the operation of the wheel, the levers 45 may be operated by means of the rack bars 49, the pinions, the shaft 51, the gear wheels 53, and the crank 54, to swing the levers 45 to such a position that the roller or projection 48 is in the path of the outer end of the slide 41, as delineated in Figure 8. Then, as the wheel rotates, the latches 42 will be disengaged from the seats 32, and the water wheel blades will slide inwardly at the top of the wheel, one after another, into the position shown at 59 in Figure 3. When the blades slide into the position shown at 59, the latches 42 engage in the seats 31 of the spokes 28, and the blades will be held in the position to which they have slid, inwardly, the eyes 38 cooperating with the collars 30 to stop the inward movement of the blades, and to enable the latches 42 to enter the seats 31. By the time that the wheel has made a complete revolution, all of the blades of the water wheel will have been retracted, and the water proceeding through the opening 9 will have practically no effect in rotating the water wheel.

When it is desired to start the water wheel, the lever 55 is tilted on its fulcrum 56, and the rollers 57, cooperating with the slides 41, will detach the latches 42 from the seats 31, the blades at the bottom of the wheel dropping downwardly by gravity and the latches 42 engaging again in the seats 32. Figure 9 of the drawings shows one of the rollers in position to cooperate with the outer end of one of the slides 41, thereby to cause the latch to be disengaged and to permit the blade at the bottom of the wheel to drop downwardly, as aforesaid. A slight rotation may be imparted to the wheel, to cause the roller 57 to operate the first one of the slides 41 and to permit one of the blades of the water wheel to slide downwardly, and, thereafter, the wheel will rotate due to the impulse of the water, the outer ends of the slides 41 coming, one after another, into contact with the rollers 57.

The construction of the device is such that when all of the blades are retracted as shown at 59 in Figure 3, the water can still pass through the opening 9 and move down stream to operate another water wheel of the kind hereinbefore described.

Referring particularly to Figure 1, it is to be observed that the float 22 is connected to the wing walls 3 by flexible elements 60, such as chains, in which there is a little slack. The reason for providing these chains 60 is to limit the downward movement of the float and to suspend the float when the water has fallen considerably. It is undesirable to have the float 22 move down too far with the receding water, because the line 23 may get too much slack in it and be sucked into the opening 9, thereby interfering with the handling of the gate 12, or interfering with the operation of the water wheel.

What is claimed is:—

1. A water wheel comprising a frame, blades slidably mounted on the frame, latches connecting the blades with the frame to hold the blades advanced and to hold the blades retracted, levers, and fulcra therefor, each lever being under the control of an operator, one lever being movable into the path of the latches when the blades are advanced and near the top of the wheel, thereby to permit the blades to slide toward the center of the wheel, the other lever being movable into the path of the latches when the blades are retracted and near to the bottom of the wheel, thereby to permit the blades to slide toward the periphery of the wheel.

2. A water wheel comprising a frame, blades slidably mounted on the frame and having openings, guides on the blades, slides movable in the guides in a direction substantially parallel to the axis of rotation of the water wheel and having latches movable in the openings, the frame having seats which are spaced apart radially of the wheel, springs on the slides and engaging the guides and the latches to hold the latches in the seats, thereby to maintain the blades advanced and to maintain the blades retracted, means under the control of an operator for engaging the slides to release the latches when the blades are advanced and near to the top of the wheel, thereby to permit the blades to slide toward the center of the wheel, and means under the control of an operator for releasing the latches when the blades are retracted and near to the bottom of the wheel, thereby to permit the blades to slide toward the periphery of the wheel.

In testimony that I claim the foregoing as my own, I have hereto fixed my signature.

CHAUNCEY RAMSDELL.